R. P. ELLIOTT.
DEVICE FOR CLOSING IN SLOTTED PISTON RINGS.
APPLICATION FILED FEB. 1, 1915.
1,258,664. Patented Mar. 12, 1918.
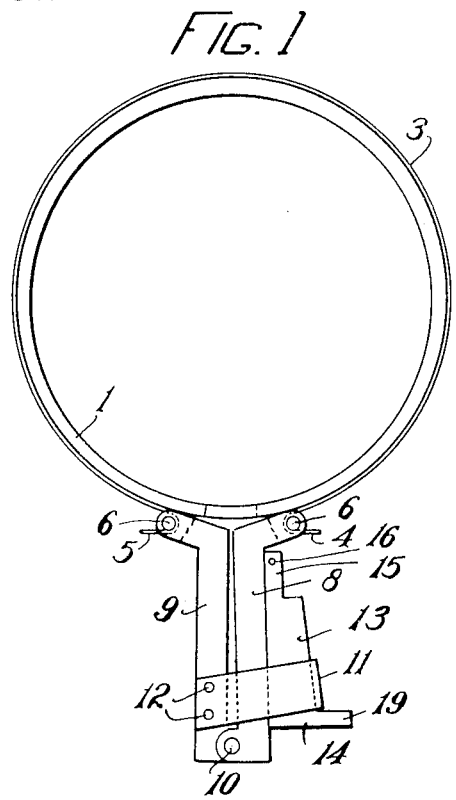
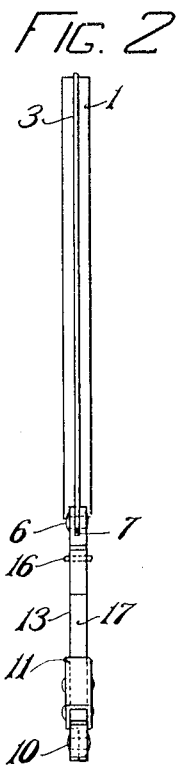
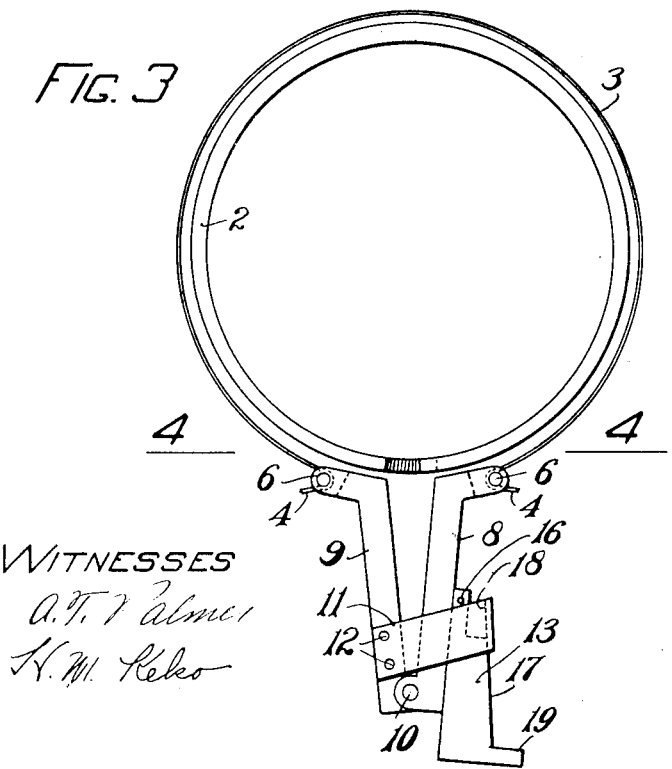
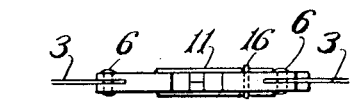
WITNESSES
INVENTOR
Richard P. Elliott

UNITED STATES PATENT OFFICE.

RICHARD P. ELLIOTT, OF BOSTON, MASSACHUSETTS.

DEVICE FOR CLOSING IN SLOTTED PISTON-RINGS.

1,258,664. Specification of Letters Patent. Patented Mar. 12, 1918.

Application filed February 1, 1915. Serial No. 5,417.

*To all whom it may concern:*

Be it known that I, RICHARD P. ELLIOTT, a citizen of the United States, residing in Boston, county of Suffolk, State of Massachusetts, have invented certain new and useful Improvements in Devices for Closing In Slotted Piston-Rings, of which the following is a specification, reference being had to the drawings accompanying the same and forming a part thereof.

My invention relates to a device for closing in piston rings such as are used for packing in the grooves of pistons of steam and gasolene engines; *i. e.*, when piston rings are turned approximately to size and a slot cut so as to remove a portion of the ring, it is desirable to thereafter close in the ring and grind or finish it on the outside to the diameter of the bore of the cylinder in which it is to be used.

The object of my invention is to provide a flexible means, such as a piece of fine wire, preferably piano wire, with a fixture engaging the hooked ends of the wire in such manner that the ends of the wire can be drawn together to compress a piston ring inclosed within the coil of the wire to close its slot together, the wire being flexible so as not to place undue strain on any part of the diameter of the piston ring to distort it. In other words, the object is to use a flexible closing-in device for closing in rings in such manner that a ring will assume such shape as the slight variations in the thickness of the wall or variations in the hardness of the metal at different points would normally cause it to assume, the wire being so flexible that it does not constrain the ring at any one point.

Figure 1 represents a plan view of my closing-in device as it appears when the wire is drawn together to close a ring in and bring the ends of the slot in contact with each other;

Fig. 2 is an edge elevation of the device as shown in Fig. 1;

Fig. 3 shows a plan view of the device before it is closed in to close the slot in the ring, and shows the position of the closing-in wedge when the device is operated to receive a ring;

Fig. 4 is an end view of the closing-in device taken through line 4—4, Fig. 3, so as to show the manner of attaching the wires to the closing-in fixture.

In the drawings, 1 represents a piston ring with the slot closed together, and 2 a piston ring with the slot open. The closing-in device consists of a flexible wire 3, which preferably has hooks bent up on its ends, as at 4 and 5, and so positioned as to hook around pins 6, 6. The pins 6, 6, extend through and are secured in both sides of the slot 7 in the legs 8 and 9 of the closing-in device so that the hooks will be free to rotate on the pivots 6, 6. The legs 8 and 9 of the closing-in device are joined together by the pivot 10 so as to freely revolve thereon. One of the legs, as 9, has a strap 11 riveted to it by the rivets 12, 12, so that the loop portion extends around and beyond the leg 8 to receive a wedge 13, the wedge 13 being tapered from the end 14 toward the end 15, and a pin 16 provided so that the wedge will not fall out.

The purpose of having the flexible wire 3 attached to the legs 8 and 9 by the hooks 4 and 5 surrounding the pins 6, 6 is so that the closing-in fixture may be used with different lengths of wire for the purpose of closing in rings of different diameters. One set of closing-in fixtures may be used with any number of wires 3 for an indefinite number of sizes of piston rings.

The wedge 13 is made sufficiently tapering so as to allow a sufficient spread between the free ends of the legs 8 and 9 so that the fixture may be used to close in slots of different widths from the narrowest to the widest slot.

The operation of my improved closing-in fixture is as follows:—The fixture being provided with a wire 3 sufficiently large in circumference or diameter to pass around the ring 2 when the slot is open, then the legs 8 and 9 are drawn together by pushing inwardly the wedge 13 so as to draw the slot of the ring together, the wedge 13 is so positioned in the strap 11 that its edge 17 will contact with the inside of the loop 18 of the strap 11, and thus hold the slot of the ring closed in until the ring can be permanently held closed in by being gripped between the plates of a grinding fixture, the plates of the grinding fixture holding the ring on its sides rather than on its diameter. After the ring has been clamped in the grinding fixture the wedge is driven out by striking the extending portion 19 and the wire released from the circumference of the ring and removed.

It will be seen that these fixtures are made narrower than the ring to be closed in; *i. e.*, in practice, practically the narrowest piston ring made is ¼" wide. These fixtures can be made about ⅛" wide so as not to project beyond the edges of the ring when in place.

It will be noted that the fixture and ring as shown in Fig. 1, after the slot in the ring has been closed in, can be carried around and placed on any fixture, or in other words, a number of devices can be used to close in a number of rings, each independent of the other, but so that a number of these rings can be put upon a finishing fixture without the closing-in devices interfering with each other, and the rings clamped sidewise between the shoulders of the grinding or finishing fixtures, and after being clamped to hold them closed the fixture may be removed independent of each other.

A threaded screw or similar device may be used for drawing the legs 8 and 9 together without departing from the spirit of my invention.

What I claim is—

1. In a device for contracting piston rings, in combination, a contracting fixture comprising two members united at one end to form a hinge joint, the opposite ends of said members being turned outwardly, slotted and provided with a pin near the outer end of each slot; means for locking said contracting fixture in any desired operative position; and a flexible wire band having a hook formed on each of its ends, said hooks being adapted to be quickly engaged or disengaged from the pins in said contracting fixtures.

2. In a device for contracting piston rings, in combination, a contracting fixture comprising two members united at one end to form a hinge joint, the opposite ends of said members being turned outwardly, slotted and provided with a pin near the outer end of each slot, a substantially U-shaped member secured to one of said members and inclosing the other, a wedge-shaped member adapted to coöperate with said U-shaped member to lock said contracting fixture in any desired operative position, and a flexible wire band having a hook formed on each of its ends, said hooks being adapted to quickly engage or be disengaged from the pins in the said contracting fixture.

In testimony whereof, I have hereunto set my hand, in the presence of two subscribing witnesses, this the 30th day of January A. D. 1915.

RICHARD P. ELLIOTT.

Witnesses:
D. Baker,
H. M. Kelso.